United States Patent
Matsuda (10) Patent No.: US 6,913,627 B2
(45) Date of Patent: Jul. 5, 2005

(54) MULTI-FINGER HAND DEVICE

(75) Inventor: Hiroshi Matsuda, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/433,916

(22) PCT Filed: Nov. 30, 2001

(86) PCT No.: PCT/JP01/10501

§ 371 (c)(1),
(2), (4) Date: Jun. 6, 2003

(87) PCT Pub. No.: WO02/45918

PCT Pub. Date: Jun. 13, 2002

(65) Prior Publication Data

US 2004/0054424 A1 Mar. 18, 2004

(30) Foreign Application Priority Data

Dec. 6, 2000 (JP) ........................ 2000-372063

(51) Int. Cl.[7] .............................. A61F 2/54; A61F 2/68
(52) U.S. Cl. ........................................ 623/64
(58) Field of Search ..................... 623/64, 57

(56) References Cited

U.S. PATENT DOCUMENTS

| | | | | |
|---|---|---|---|---|
| 2,549,074 A | * | 4/1951 | Fishbein et al. | 623/64 |
| 2,696,010 A | * | 12/1954 | Robinson | 623/26 |
| 3,866,966 A | * | 2/1975 | Skinner, II | 294/106 |
| 4,834,761 A | * | 5/1989 | Walters | 623/26 |
| 4,921,293 A | * | 5/1990 | Ruoff et al. | 294/111 |
| 4,946,380 A | * | 8/1990 | Lee | 623/24 |
| 4,986,723 A | * | 1/1991 | Maeda | 414/729 |
| 5,062,673 A | * | 11/1991 | Mimura | 294/111 |
| 5,092,646 A | * | 3/1992 | Smallridge | 294/111 |
| 5,807,376 A | * | 9/1998 | Viola et al. | 606/1 |

FOREIGN PATENT DOCUMENTS

| | | | | |
|---|---|---|---|---|
| DE | 19755465 A1 | * 6/1999 | | A61F/2/54 |
| JP | 50-28551 | 8/1975 | | |
| JP | 50-32927 | 9/1975 | | |
| JP | 60-207795 | 10/1985 | | |
| JP | 63-251186 | 10/1988 | | |
| JP | 5-196 | 1/1993 | | |
| JP | 06-008178 | 1/1994 | | |
| JP | 6-31983 | 4/1994 | | |
| JP | 8-300282 | 11/1996 | | |
| JP | 2000-325375 A | * 11/2000 | | A61F/2/54 |

OTHER PUBLICATIONS

MiMicrofilm of the specification and drawings annexed to the request of Japanese Utility model Application No. 7852/1978 (Laid–open No. 112282/1979) (Komatsu Ltd.), Aug. 7, 1979 Claims; Figs. 1 to 6.

* cited by examiner

Primary Examiner—Alvin J. Stewart
(74) Attorney, Agent, or Firm—Rankin, Hill, Porter & Clark LLP (57) ABSTRACT

A multi-fingered hand device has a reduced number of actuators as a drive source for bending and extending finger mechanisms and is capable of smoothly bending and extending the finger mechanisms to work on an object, e.g., to grip an object. Finger mechanisms $2a$–$2e$ are biased to an extended position by springs 16, 25. A wire 30 extending from finger mechanisms $2b$, $2c$ and a wire 29 extending from the finger mechanisms $2d$, $2e$ are trained respectively around pulleys 33, 32, and a wire 31 extending from the finger mechanism $2a$ is trained around a pulley 36 and drawn into an arm 5. The pulleys 32, 33, 36 are rotatably held by a pulley holder 43 which is angularly movable about a support shaft 42 and movable toward the arm 5. An actuator disposed in the arm 5 pulls the wire 31 or releases the wire 31 to bend or extend the finger mechanisms $2a$–$2e$ altogether. Even if any of the finger mechanisms $2a$–$2e$ abut against an object and fail to move when they are being bent or extended, the other finger mechanisms can be bent or extended.

16 Claims, 7 Drawing Sheets

MULTI-FINGER HAND DEVICE

TECHNICAL FIELD

The present invention relates to a multi-fingered hand device having a plurality of finger mechanisms.

BACKGROUND ART

Multi-fingered hand devices having a structure similar to human hands comprise a plurality of finger mechanisms extending from a palm mounted on the distal end of an arm. Each of the finger mechanisms comprises a plurality of interjoint members (link members) successively connected by a plurality of finger joints.

There have heretofore been known multi-fingered hand devices of the above type which have actuators associated with the respective finger mechanisms for actuating the finger joints of the finger mechanisms. The actuators are disposed in positions (e.g., in the palm, the arm, or the like) spaced from the finger mechanisms, and are connected to the respective finger mechanisms by wires and pulleys around which the wires are trained. The wires are pulled by the respective actuators to bend the finger mechanisms. Reference should be made to Japanese laid-open patent publication No. 60-207795 and Japanese laid-open patent publication No. 6-8178, for example.

Since the conventional multi-fingered hand devices of the above type have actuators associated with the respective finger mechanisms, a large space is required for installing many actuators therein though the finger mechanisms can independently be controlled for their bending actions. Furthermore, because the wires interconnecting the finger mechanisms and the corresponding actuators are required respectively by the finger mechanisms, another space is also required for laying out the many wires therein, and the wires are laid out in a complex pattern.

One solution to the above problems would be to bias the finger mechanisms into an extended or bent position with springs or the like, join wires extending from the respective finger mechanisms to each other, and pull the joined wires with a single actuator to bend or extend the finger mechanisms.

However, when the finger mechanisms are bent to grip an object, for example, if either one of the finger mechanisms abuts against the object or another obstacle and fails to be bent further, then the other finger mechanisms are also unable to be bent, failing to grip the object properly. When the finger mechanisms are to be extended from a bent position, if one of the finger mechanisms abuts against an obstacle or the like and cannot be extended further, then the other finger mechanisms are also unable to be extended.

The present invention has been made in view of the above background. It is an object of the present invention to provide a multi-fingered hand device having a plurality of finger mechanisms that can be bent and extended through wires by a small number of actuators, which serve as drive sources for bending and extending the finger mechanisms, and can be bent and extended smoothly for gripping an object.

DISCLOSURE OF THE INVENTION

To achieve the above object, a multi-fingered hand device according to the present invention is available in basic aspects including a first aspect and a second aspect. According to the first aspect, a multi-fingered hand device has a palm assembly mounted on a distal end of an arm, a plurality of finger mechanisms extending from the palm assembly and each comprising a plurality of interjoint members successively connected by a plurality of finger joints, biasing means for biasing the finger mechanisms to either one of an extended position and a bent position, wire members extending from the finger mechanisms toward the palm assembly, and drive means for pulling the wire members extending from the finger mechanisms against a bias of said biasing means for bending or extending the finger mechanisms, the multi-fingered hand device being characterized in that two wire members extending respectively from at least two of said plurality of finger mechanisms have ends near the palm assembly which are integrally coupled to each other, and said drive means comprises a pulley member around which said two wire members which are integrally coupled to each other are trained, and a pulley holder on which said pulley member is rotatably held, said pulley holder being mounted on said palm assembly for movement in unison with said pulley member in a direction to pull said two wire members, and said pulley holder is moved to pull the wire member extending from the two finger mechanisms for bending or extending said two finger mechanisms, said finger mechanisms comprise at least three finger mechanisms, and said drive means comprises an auxiliary pulley member rotatably held by said pulley holder, with a wire member extending from another finger mechanism than said two finger mechanisms and trained around said auxiliary pulley member, and the wire member extending from the other finger mechanism is pulled by said auxiliary pulley member together with said pulley holder in the direction to pull the wire member extending from said two finger mechanisms for bending and extending said two finger mechanisms and said other finger mechanism.

The first aspect of the present invention will be described below. For a better understanding of the first aspect of the present invention, the first aspect will be described below using reference characters shown in FIG. 1.

According to the first aspect of the present invention, with respect to said two finger mechanisms (e.g., 2b, 2c), said drive means basically moves said pulley holder (43) (moves said pulley holder rearwardly in FIG. 1) to pull the wire member (30) extending from the two finger mechanisms (2b, 2c) against the bias of the biasing means for thereby bending or extending the two finger mechanisms (2b, 2c). Therefore, at least the two finger mechanisms (2b, 2c) may not have respective actuators, but can be bent or extended by a single actuator. Even if either one of the two finger mechanisms (2b, 2c) abuts against an object or the like and fails to move, the pulley member (33) acts like a moving roller, and moves in unison with the pulley holder (43) while rotating, causing the other finger mechanism to be bent or extended.

According to the first aspect of the present invention, therefore, the multi-fingered hand device has a reduced number of actuators as a drive source for bending and extending the finger mechanisms and is capable of smoothly bending and extending the finger mechanisms to work on an object, e.g., to grip an object. The other finger mechanisms than the above two finger mechanisms may be bent or extended by respective actuators which pull wire members extending from the finger mechanisms. However, the other finger mechanisms than the above two finger mechanisms may be bent or extended by a common actuator according to another arrangement of the present invention to be described below.

Basically, when the wire member (31) extending from the other finger mechanism (2a) is pulled, the other finger mechanism (2a) is bent or extended, and at the same time, the auxiliary pulley member (36) is moved in unison with the pulley holder (43) and the pulley member (33) held thereby to pull the wire member (30) extending from said two finger mechanisms (2b, 2c), causing the two finger mechanisms (2b, 2c) to be bent or extended. Unless the other finger mechanism (2a) abuts against an object and fails to move, the other finger mechanism (2a) can be pulled by the wire member (31) extending therefrom, and hence can be bent or extended. Even if either one (2b or 2c) of the two finger mechanisms (2b, 2c) abuts against an object and fails to move, since the pulley member (33) can move in unison with the auxiliary pulley member (36), the other finger mechanism can be bent or extended.

According to the present invention, therefore, even if any of the three finger mechanisms, i.e., said two finger mechanisms and said other finger mechanisms, abut against an object and fail to move, the remaining finger mechanisms can be bent or extended. The three finger mechanisms can be bent or extended by pulling the wire member extending from the other finger mechanism with a single actuator.

According to the second aspect of the present invention, a multi-fingered hand device has a palm assembly mounted on a distal end of an arm, a plurality of at least four finger mechanisms extending from the palm assembly and each comprising a plurality of interjoint members successively connected by a plurality of finger joints, biasing means for biasing the finger mechanisms to either one of an extended position and a bent position, wire members extending from the finger mechanisms toward the palm assembly, and drive means for pulling the wire members extending from the finger mechanisms against a bias of said biasing means for bending or extending the finger mechanisms, the multi-fingered hand device being characterized in that at least four of said plurality of finger mechanisms are classified into two pairs of two finger mechanisms, with two wire members extending from each of the two finger mechanisms in each pair and having ends near the palm assembly which are integrally coupled to each other, and said drive means comprises a pair of pulley members around which said two wire members which are integrally coupled to each other in each of two finger mechanisms in each pair are trained, respectively, and a pulley holder on which said pulley members are rotatably held at a spaced interval, said pulley holder being mounted on said palm assembly for angular movement about a support intermediate between the pulley members in unison with said pair of pulley members in a direction to pull said wire members extending respectively from said four finger mechanisms, and said pulley holder is moved to pull the wire members extending from the four finger mechanisms for bending or extending said four finger mechanisms.

The second aspect of the present invention will be described below. For a better understanding of the second aspect of the present invention, the second aspect will be described below using reference characters shown in FIG. 1, as with the first aspect. According to the second aspect of the present invention, with respect to said four finger mechanisms (e.g., 2b, 2c, 2d, 2e), said drive means basically moves said pulley holder (43) (moves said pulley holder rearwardly in FIG. 1) to pull the wire members (29, 30) extending from the four finger mechanisms (2b, 2c, 2d, 2e) against the bias of the biasing means for thereby bending or extending the four finger mechanisms (2b, 2c, 2d, 2e). Therefore, at least the four finger mechanisms (2b, 2c, 2d, 2e) may not have respective actuators, but can be bent or extended by a single actuator. Even if either one of the four finger mechanisms (2b, 2c, 2d, 2e) abuts against an object or the like and fails to move, the pulley member (32) around which the wire (29) extending from the stuck finger mechanism (e.g., 2e) and the finger mechanism (2d) paired with the stuck finger mechanism (2e) moves in unison with the pulley holder (43) while rotating. The pulley (33) associated with the other pair of two finger mechanisms (2b, 2c) than the pair to which the stuck finger mechanism (2e) belongs can also moved in unison with the pulley holder (43) without fail. Therefore, the three finger mechanisms (2b–2d) other than the stuck finger mechanism (2e) can be bent or extended. This operation holds true if a finger mechanism (e.g., 2e) belonging to one of the two pairs of four finger mechanisms (2b–2e) and a finger mechanism (e.g., 2b) belonging to the other pair fail to move. In this case, the pulley members (32, 33) move in unison with the pulley holder (43) while rotating, causing the two finger mechanisms (2c, 2d) other than the stuck finger mechanisms (2e, 2b) to be bent or extended.

If two finger mechanisms (e.g., 2d, 2e) belonging to one of the two pairs of four finger mechanisms (2b–2e) fail to move, then the pulley (32) corresponding to the pair of finger mechanisms (2d, 2e) cannot move in unison with the pulley holder (43). However, when the pulley holder (43) is angularly moved about the support (42) intermediate thereon, the pulley (33) corresponding to the other pair of finger mechanisms (2b, 2c) can move. Likewise, if three finger mechanisms (e.g., 2c, 2d, 2e) of the four finger mechanisms (2b–2e) fail to move, then the pulley member (33) corresponding to the movable finger mechanism (2b) rotates and the pulley holder (43) is angularly moved to move the pulley member (33), causing the movable finger mechanism (2b) to be bent or extended.

According to the second aspect of the present invention, therefore, even if any of the four finger mechanisms abut against an object and fail to move, the other finger mechanisms can be bent or extended. The four finger mechanisms can be bent or extended by moving the pulley holder with a single actuator.

According to the second aspect of the present invention, therefore, as with the first aspect of the present invention, the multi-fingered hand device has a reduced number of actuators as a drive source for bending and extending the finger mechanisms and is capable of smoothly bending and extending the finger mechanisms to work on an object, e.g., to grip an object. In the second aspect, the basic operation of each of the pairs of two finger mechanisms basically is the same as with the first aspect.

In the second aspect of the present invention, if said finger mechanisms comprise at least five finger mechanisms, then said drive means comprises an auxiliary pulley member (36) rotatably held by said pulley holder (43) between said pair of pulley members (32, 33), with a wire member (31) extending from another finger mechanism (2a) than said four finger mechanisms (2b–2e) and trained around said auxiliary pulley member (36), and the wire member (31) extending from the other finger mechanism (2a) is preferably pulled by said auxiliary pulley member (36) together with said pulley holder (43) in the direction to pull the wire members (29, 30) extending from said four finger mechanisms (2b–2e) for bending and extending said four finger mechanisms (2b–2e) and said other finger mechanism (2a).

With the above arrangement, basically, when the wire member (31) extending from the other finger mechanism (2a) is pulled, the other finger mechanism (2a) is bent or extended, and at the same time, the auxiliary pulley member (36) is moved in unison with the pulley holder (43) and the pulley members (32, 33) held thereby to pull the wire members (29, 30) extending from said four finger mechanisms (2b–2e), causing the four finger mechanisms (2b–2e) to be bent or extended. Unless the other finger mechanism (2a) abuts against an object and fails to move, the other finger mechanism (2a) can be pulled by the wire member (31) extending therefrom, and hence can be bent or extended. Even if any of the four finger mechanisms (2b–2e) abut against an object and fail to move, since the pulley member corresponding to the remaining finger mechanisms other than the stuck finger mechanism can move in unison with the auxiliary pulley member (36), the remaining finger mechanisms can be bent or extended.

According to the present invention, therefore, even if any of the five finger mechanisms, i.e., said four finger mechanisms and said other finger mechanisms, abut against an object and fail to move, the remaining finger mechanisms can be bent or extended. The five finger mechanisms can be bent or extended by pulling the wire member extending from the other finger mechanism with a single actuator.

In the present invention described above (including both the first aspect and the second aspect), the wire member extending from each of the finger mechanisms may extend from the tip of the finger mechanism. Preferably, however, at least one of said plurality of finger mechanisms has a link mechanism coupled to the interjoint members thereof and operable in ganged relation to angular movement of one of the interjoint members connected to one of the joints which is closest to the palm assembly for turning the interjoint members about the other joints. The wire member which extends from said one finger mechanism extends from the interjoint member closest to the palm assembly.

With the above arrangement, in each of the finger mechanisms having the link mechanism, the wire member extending from the interjoint member closest to the palm assembly is pulled to turn the interjoint member closest to the palm assembly about the finger joint closest to the palm assembly, whereupon the other joints are bent or extended in ganged relation to the turning movement of the interjoint member, causing the finger mechanism to be bent or extended. Consequently, the wire member may extend from the palm assembly to the interjoint member closest to the palm assembly, and hence may have a short length. The length of the wire member may thus be small for a cost reduction.

At least two intermediate members of at least two of the plurality of finger mechanisms should preferably be identical in structure.

Since the at least two finger mechanisms can share the interjoint members, the number of types of required parts of the multi-fingered hand device may be small, and hence those parts can be managed with ease and subject to easy maintenance.

According to the present invention, if said palm assembly is disposed for rotation about an axis extending substantially in a longitudinal direction of said arm, then said drive means comprises means having at least one drive wire member extending from said palm assembly into said arm, and an actuator for applying a drive force to said drive wire member tending to pull the drive wire member into the arm, said means being arranged for transmitting a force tending to pull the wire members extending from the finger mechanisms from said actuator through said drive wire member to the palm assembly, said drive wire member being disposed in said arm along an axis about which said palm assembly is rotatable.

Inasmuch as the drive wire member is disposed in the arm along the axis about which the palm assembly is rotatable, the drive wire member is not pulled even when the palm assembly is rotated with respect to the arm. Therefore, the palm assembly can be rotated with respect to the arm while the finger mechanisms extending from the palm assembly remain bent or extended. If the actuator is disposed in the arm, then the palm assembly may be reduced in size.

With the multi-fingered hand device having five finger mechanisms, if the drive means has a pair of pulley members and an auxiliary pulley member as with the second aspect of the present invention, then the drive wire member may be integral with the wire member extending from the other finger mechanism or may be a single wire member coupled to the wire member.

In the multi-fingered hand device according to the present invention with the palm assembly being rotatable with respect to the arm, said arm and said palm assembly are preferably electrically insulated from each other, and said drive wire member is preferably made of an insulating material.

With the above arrangement, even when the palm assembly and the finger mechanisms are immersed in water, no current leakage occurs from electric components in the arm to the palm assembly. Therefore, the multi-fingered hand device can work on an object, e.g., grip an object, in water without fail.

In the present invention as described above, the force applied to grip an object with the multi-fingered hand device can be adjusted by controlling the force tending to pull the wire member extending from the finger mechanisms if the finger mechanisms are biased to the extended position by the biasing means, and can be adjusted by adjusting the bias of the biasing means if the finger mechanisms are biased to the bent position by the biasing means.

In the present invention as described above, the term "wire member" covers a wire in ordinary meaning and members such as a chain, a belt, etc., and the term "pulley member" covers a pulley in ordinary meaning and members such as a gear, a sprocket, etc.

BEST MODE FOR CARRYING OUT THE INVENTION

Figure 1:
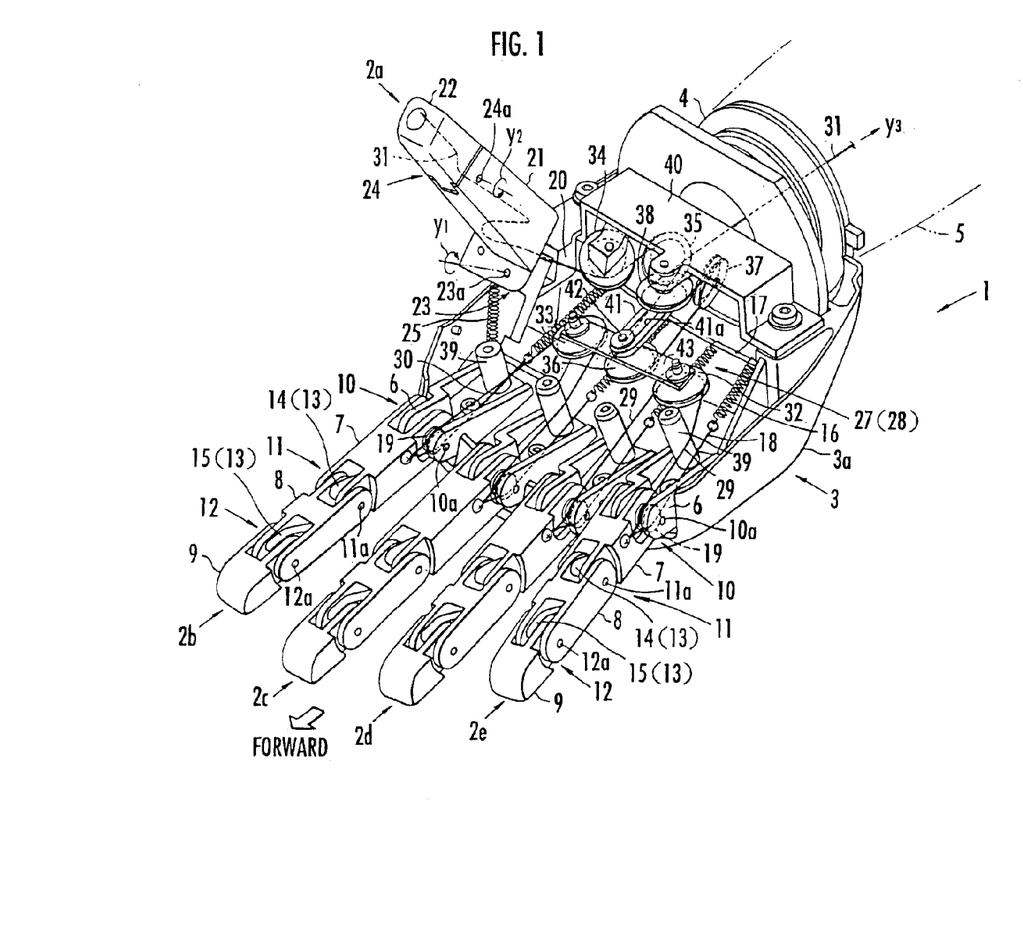
FIG. 1 is a perspective view of a multi-fingered hand device according to an embodiment of the present invention.
Figure 2:
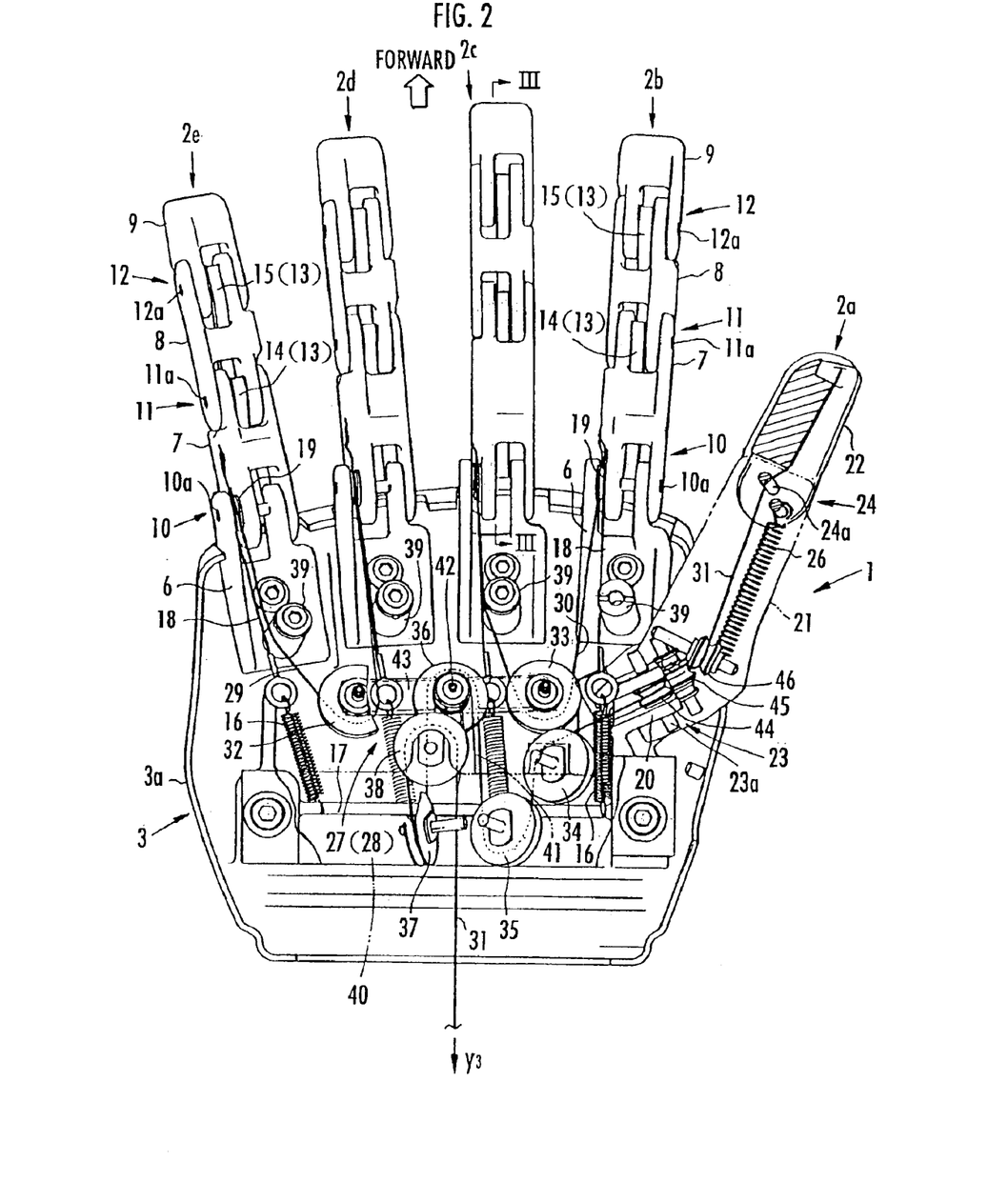
FIG. 2 is a plan view showing essential parts of the multi-fingered hand device.
Figure 3:
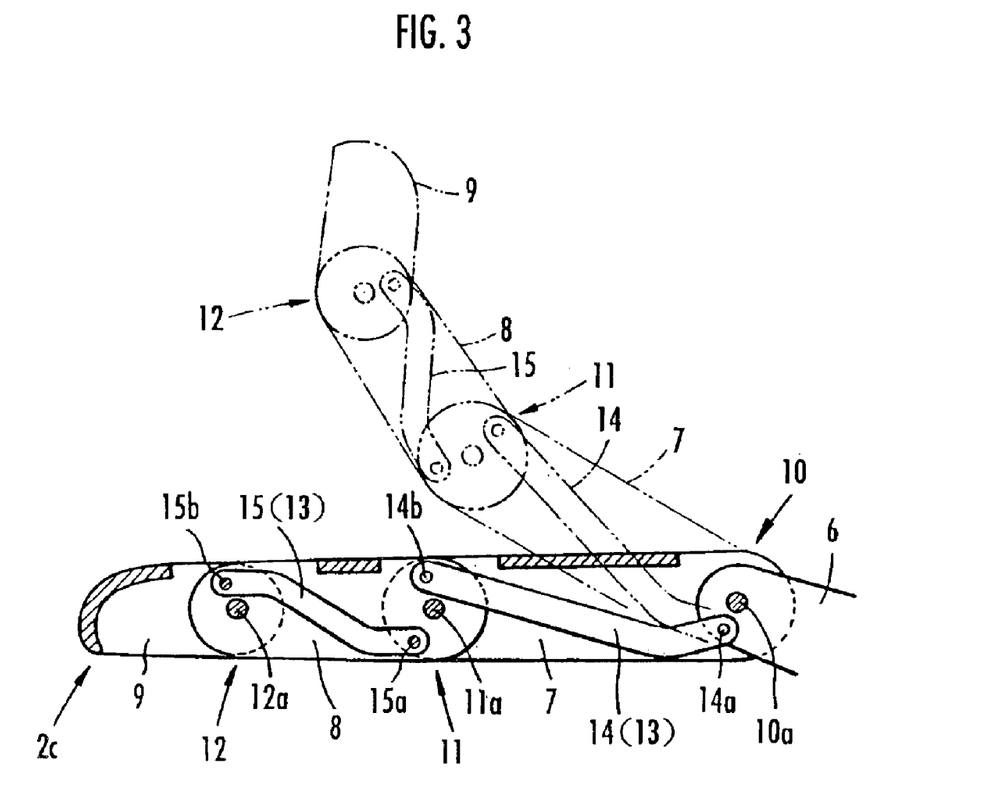
FIG. 3 is a vertical cross-sectional view taken along line III—III of FIG. 2.
Figure 4:
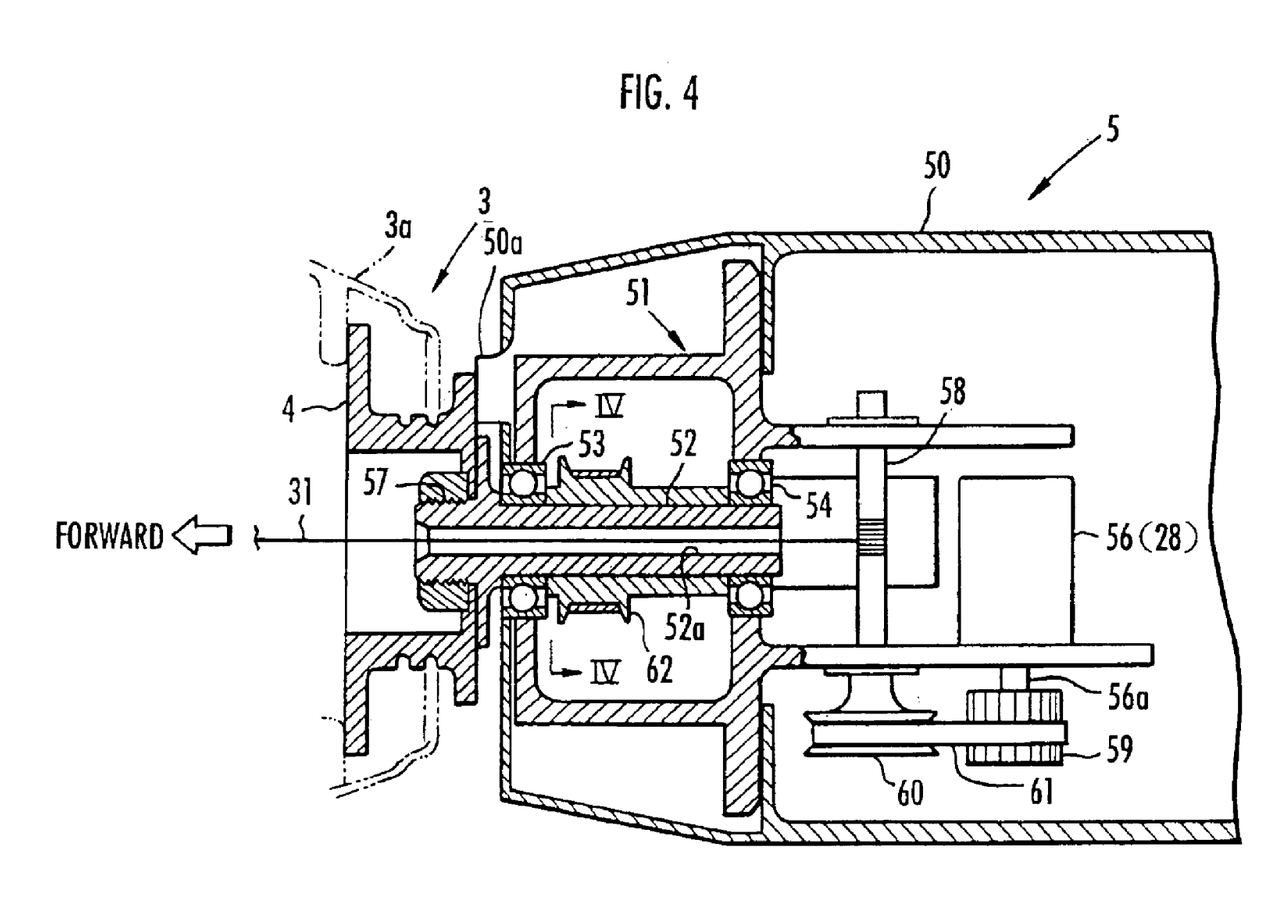
FIG. 4 is a cross-sectional view showing an internal structure of an arm on which the multi-fingered hand device shown in FIG. 1 is mounted.
Figure 5:
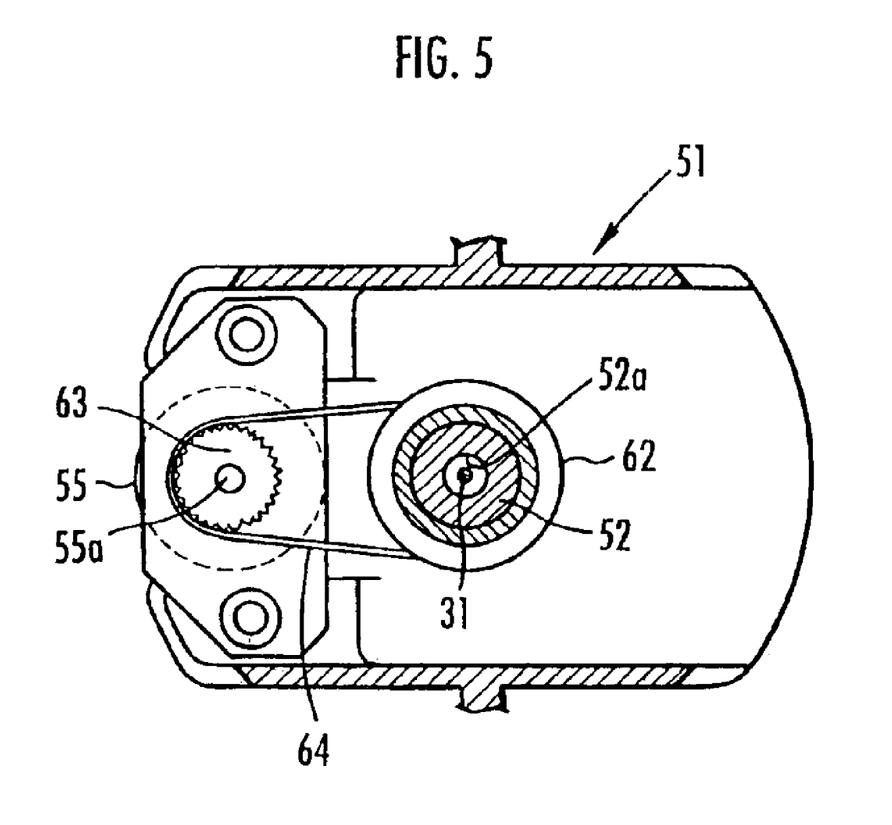
FIG. 5 is a cross-sectional view taken along line IV—IV of FIG. 4.
Figure 6:
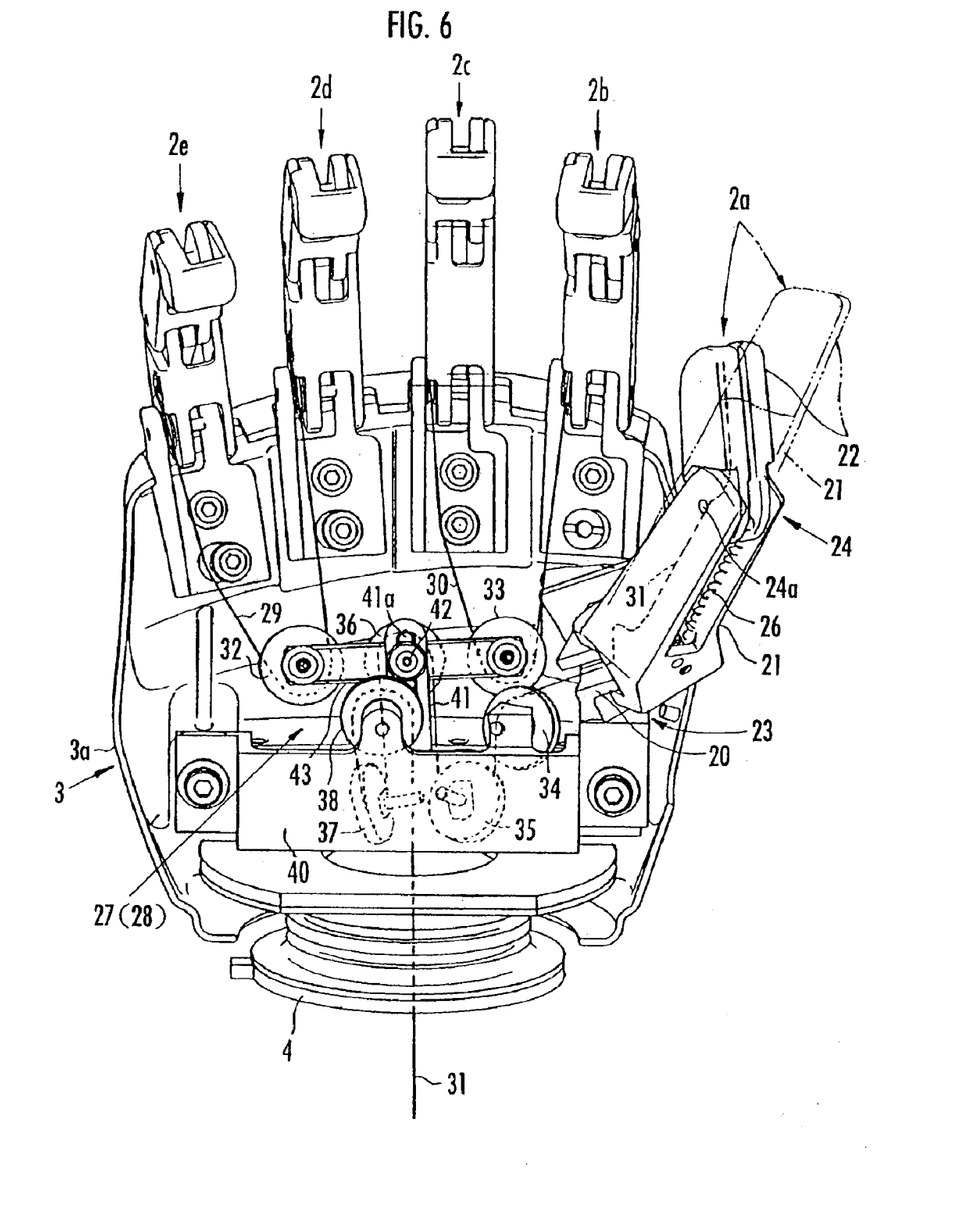
FIGS. 6 and 7 are views showing the manner in which the multi-fingered hand device shown in FIG. 1 operates.
Figure 7:
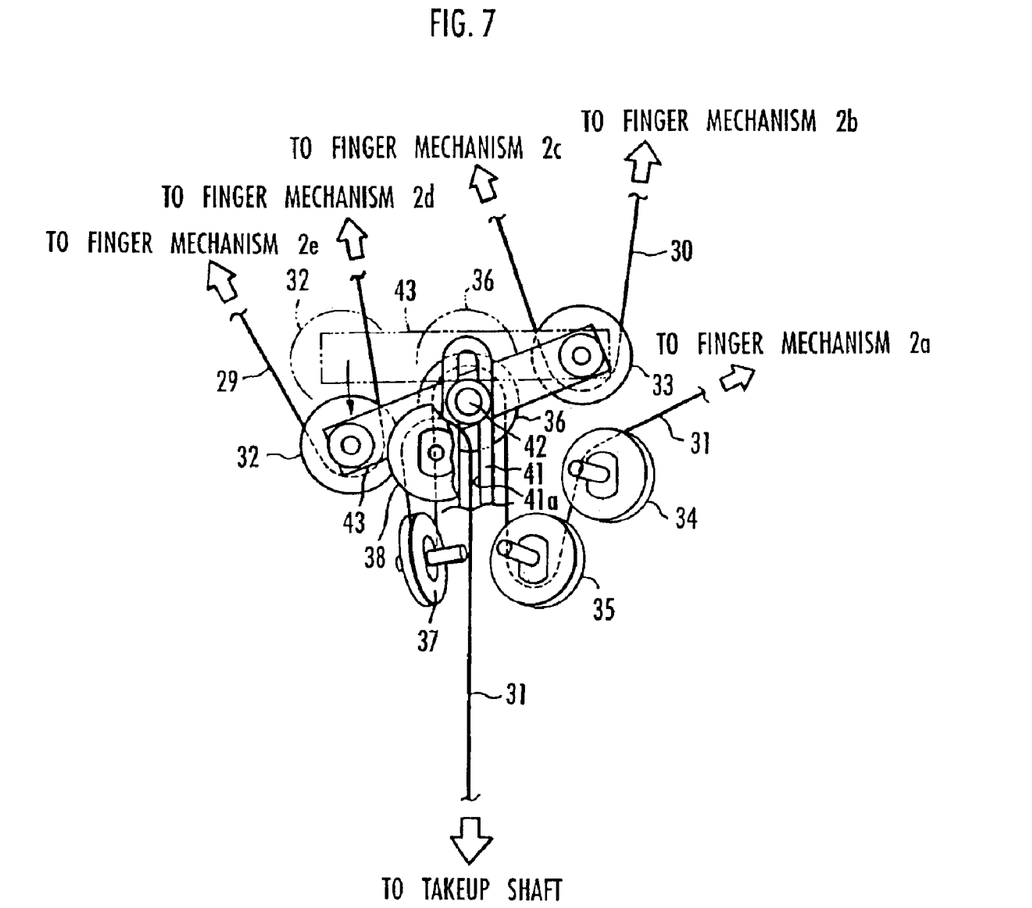

An embodiment of a multi-fingered hand device according to the present invention will be described below with reference to FIGS. 1 through 7. FIG. 1 is a perspective view of a multi-fingered hand device according to an embodiment of the present invention; FIG. 2 is a plan view showing essential parts of the multi-fingered hand device; FIG. 3 is a cross-sectional view taken along line III—III of FIG. 2; FIG. 4 is a cross-sectional view showing an internal structure of an arm on which the multi-fingered hand device shown in FIG. 1 is mounted; FIG. 5 is a cross-sectional view taken along line IV—IV of FIG. 4; and FIGS. 6 and 7 are views showing the manner in which the multi-fingered hand device shown in FIG. 1 operates. The present embodiment is an embodiment corresponding to both a first aspect and a second aspect of the present invention.

As shown in FIG. 1, a multi-fingered hand device 1 according to the present embodiment has a structure similar to human hands and comprises a plurality of finger mechanisms 2a–2e extending from a palm assembly 3. The multi-fingered hand device 1 is mounted on an arm 5 of a main robot body (not shown) of a human-shaped robot or the like by a wrist base 4 of the palm assembly 3. The finger mechanisms 2a–2e correspond respective to the thumb, index finger, middle finger, ring finger, and little finger of a human hand.

The palm assembly 3 comprises an assembly of a hand back forming member 3a for forming the face of a hand back, the wrist base 4, and a hand palm forming member (not shown) for forming the outer surface of a hand palm. In the drawings showing the present embodiment, including FIG. 1, the hand palm forming member is omitted from illustration for illustrating an internal structure of the palm 3. The hand palm forming member is attached to the hand back forming member 3a in covering relation to internal parts mounted on the hand back forming member 3a. In FIG. 1, a lower portion of the palm assembly 3 serves as the hand back forming member 3a, and the hand palm forming member is assembled over the hand back forming member 3a. The wrist base 4 is essentially of a tubular shape whose outer circumference includes a lower half mounted on an end of the hand back forming member 3a close to the arm 5 and an upper half mounted on an end of the hand palm forming member close to the arm 5.

Of the finger mechanisms 2a–2e, the four finger mechanisms 2b–2e other than the finger mechanism 2a which corresponds to the thumb are identical in basic structure to each other. The structure of these four finger mechanisms 2b–2e will first be described below.

Each of the four finger mechanisms 2b–2e comprises first through third interjoint members 7, 8, 9 successively joined by first through third joints 10–12 from a fixed member 6 that is fixedly mounted on an end of the hand back forming member 3a (the end remote from the arm 5). Since the finger mechanisms 2b–2e are identical in basic structure to each other as described above, reference characters are shown to denote components (interjoint members, joints, etc.) of some of the finger mechanisms 2b–2e, and reference characters of the other finger mechanisms are omitted from illustration, in the figures which show the present embodiment.

The joints 10–12 of the finger mechanisms 2b–2e are joints for allowing the members joined thereby to turn relatively about one axis, and have joint shafts 10a–12a, respectively. The joint shafts 10a–12a extend substantially in the transverse direction of the palm assembly 3 (the direction in which the finger mechanisms 2b–2e are substantially juxtaposed). The first joint 10 joins the members 6, 7 with the joint shaft 10a such that the first interjoint member 7 can be turned about the axis of the joint shaft 10a with respect to the fixed member 6. The second joint 11 joins the members 7, 8 with the joint shaft 11a such that the second interjoint member 8 can be turned about the axis of the joint shaft 11a with respect to the first interjoint member 7. The third joint 12 joins the members 8, 9 with the joint shaft 12a such that the third interjoint member 9 can be turned about the axis of the joint shaft 12a with respect to the second interjoint member 8. The relative rotation of the interjoint members 7–9 about the joints 10–12 allow the finger mechanisms 2b–2e to be bent.

The finger mechanisms 2b–2e have respective link mechanisms 13 for turning the second interjoint member 8 and the third interjoint member 9 in ganged relation to the first interjoint member 7 when the first interjoint member 7, which is an interjoint member closest to the palm assembly 3, is turned with respect to the fixed member 6.

The link mechanisms 13 of the finger mechanisms 2b–2e are identical to each other. Structural details of the link mechanism 13 of the finger mechanism 2c, for example, will be described below with reference to FIG. 3. The link mechanism 13 comprises a link arm 14 coupling the fixed member 6 and the second interjoint member 8, and a link arm 15 coupling the first interjoint member 7 and the third interjoint member 9. The link arm 14 has an end rotatably supported on the fixed member 6 by a support shaft 14a at a position which is closer to a back surface of the finger mechanism 2c (a lower surface in FIG. 3) than the joint shaft 10a of the first joint 10, and another end rotatably supported on the second interjoint member 8 by a support shaft 14b at a position which is closer to a front surface of the finger mechanism 2c (an upper surface in FIG. 3) than the joint shaft 11a of the second joint 11.

The link arm 15 has an end rotatably supported on the first interjoint member 7 by a support shaft 15a at a position which is closer to the back surface of the finger mechanism 2c than the joint shaft 11a of the second joint 11, and another end rotatably supported on the third interjoint member 9 by a support shaft 15b at a position which is closer to the front surface of the finger mechanism 2c than the joint shaft 12a of the third joint 12.

When the first interjoint member 7 is turned clockwise with respect to the fixed member 6 (in the direction to bring the front surface of the first interjoint member 7 toward the hand palm surface of the palm assembly 3) from the solid-line position shown in FIG. 3 in which the finger mechanism 2c is extended, the second interjoint member 8 is turned clockwise with respect to the first interjoint member 7, and the third interjoint member 9 is turned clockwise with respect to the second interjoint member 8, in ganged relation to the first interjoint member 7, as indicated by the imaginary lines in FIG. 3. When the first interjoint member 7 is turned back counterclockwise with respect to the fixed member 6 from the imaginary-line position in which the finger mechanism 2c is bent to the solid-line position in FIG. 3, the second interjoint member 8 and the third interjoint member 9 are turned counterclockwise with respect to the first interjoint member 7 and the second interjoint member 8, respectively, thus extending the finger mechanism 2c. The finger mechanism 2c is thus bent and extended by turning the first interjoint member 7 with respect to the fixed member 6.

The above structure of the link mechanism 13 and the bending and extending action of the finger mechanism based on the structure of the link mechanism 13 are exactly the same for the finger mechanisms 2b, 2d, 2c.

In the present embodiment, portions of the finger mechanisms 2b–2e which range from the second joint 11 to the finger tips (portions each constructed of the second interjoint member 8, the third interjoint member 9, the third joint 12, and the link arm 15) are identical in basic structure to each other, and their parts are also fully identical in shape and size to each other.

Referring to FIGS. 1 and 2, springs 16 are disposed in the palm assembly 3 in association with the respective finger mechanisms 2b–2e as biasing means for biasing the finger mechanisms 2b–2e to their extended position.

The springs 16 are disposed substantially concentrically with the respective finger mechanisms 2b–2e at positions in the palm assembly 3 near the wrist base 4. The springs 16 have ends engaged by a spring engaging member 17 integral with the hand back forming member 3a and other ends engaged by the first interjoint members 7 of the respective finger mechanisms 2b–2e through respective biasing wires 18. Guide pulleys 19 which are rotatable about the respective joint shafts 10a are disposed concentrically with the joint shafts 10a on the respective finger mechanisms 2b–2e at positions near the first joints 10. The biasing wires 18 extend around lower outer circumferential portions of the guide pulleys 19 (near the back surfaces of the finger mechanisms 2b–2e) and are fixed to side surfaces of the first interjoint members 7. The biasing wires 18 are fixed to the first interjoint members 7 at positions higher than the lower ends of the guide pulleys 19 in the vertical direction.

With the above arrangement, the finger mechanisms 2b–2e are normally biased into the extended position under the bias of the corresponding springs 16.

In the description which follows, the direction in which the finger mechanisms 2b–2e are extended is essentially the same as the longitudinal direction of the multi-fingered hand device 1, and the tips of the finger mechanisms 2b–2e are on the front side of the multi-fingered hand device 1.

Referring to FIGS. 1 and 2, the finger mechanism 2a which corresponds to the thumb comprises first and second interjoint members 21, 22 joined by first and second joints 23, 24 from a fixed member 20 that is fixedly mounted on the hand back forming member 3a of the palm assembly 3 behind the fixed member 6 of the finger mechanism 2b. In FIG. 2, the first interjoint member 21 is represented by imaginary lines and the second interjoint member 22 is shown as being partly cut away in order to illustrate an internal structure of the finger mechanism 2a. The wrist base 4 is omitted from illustration in FIG. 2.

The joints 23, 24 of the finger mechanism 2a are joints for allowing the members joined thereby to turn relatively about one axis, and have joint shafts 23a, 24a, respectively. The joint shaft 23a of the first joint 23 is oriented slightly obliquely to the longitudinal direction of the multi-fingered hand device 1, and the joint shaft 24a of the second joint 24 is oriented in a direction substantially perpendicular to the joint shaft 23a of the first joint 23. The first joint 23 joins the members 20, 21 with the joint shaft 23a such that the first interjoint member 21 can be turned about the axis of the joint shaft 23a with respect to the fixed member 20. The second joint 24 joins the members 21, 22 with the joint shaft 24a such that the second interjoint member 22 can be turned about the axis of the joint shaft 24a with respect to the first interjoint member 21. The relative rotation of the interjoint members 21, 22 about the joints 23, 24 allow the finger mechanism 2a to be bent.

The finger mechanism 2a is bent from an extended position shown in FIGS. 1 and 2 as follows: Referring to FIG. 6, for bending the finger mechanism 2a from an extended position (the imaginary-line position shown in FIG. 6), the first interjoint member 21 is turned with respect to the fixed member 20 about the axis of the joint shaft 23a of the first joint 23 so that the first interjoint member 21 moves toward the palm assembly 3 (the first interjoint member 21 is turned in the direction indicated by the arrow y1 in FIG. 1), and the second interjoint member 22 is turned with respect to the first interjoint member 21 about the axis of the joint shaft 24a of the second joint 24 so that the tip of the second interjoint member 22 moves toward the other finger mechanisms 2b–2e (the second interjoint member 22 is turned in the direction indicated by the arrow y2 in FIG. 1). The finger mechanism 2a is thus turned as indicated by the solid lines in FIG. 6. In FIG. 6, the springs 16 and the wires 18 as the biasing means of the finger mechanisms 2b–2e are omitted from illustration.

A spring 25 shown in FIG. 1 and a spring 26 shown in FIG. 2 are provided as a biasing means for biasing the finger mechanism 2a to its extended position.

The spring 25 shown in FIG. 1, whose details are not illustrated in FIG. 1, has an end engaged by the hand back forming member 3a of the palm assembly 3 and another end engaged by the first interjoint member 21 at a position which is closer to a peripheral edge of the palm assembly 3 (to a right side of the joint shaft 23a in FIG. 2) than the joint shaft 23a of the first joint 23. The first interjoint member 21 is thus normally biased toward the extended position of the finger mechanism 2a (in the direction opposite to the direction indicated by the arrow y1 in FIG. 1) under the bias of the spring 25. The spring 26 shown in FIG. 2 has an end (not shown) engaged by the first interjoint member 21 and another end engaged by the second interjoint member 22 at a position which is closer to a back surface of the finger mechanism 2a (to a substantially right side of the joint shaft 24a in FIG. 2) than the joint shaft 24a of the second joint 24. The second interjoint member 22 is thus normally biased toward the extended position of the finger mechanism 2a (in the direction opposite to the direction indicated by the arrow y2 in FIG. 1) under the bias of the spring 26.

Referring to FIGS. 1, 2, and 6, the palm assembly 3 incorporates therein a drive mechanism 27 for bending and extending the finger mechanisms 2a–2e constructed as described above. The drive mechanism 27 cooperates with a motor 56 (actuator) to be described later on in providing a drive means 28 according to the present invention.

The drive mechanism 27 has a plurality of (three in the present embodiment) wires 29, 30, 31 (wire members) and a plurality of (seven in the present embodiment) pulleys 32–38 (pulley members).

The wire 29 has ends fixed to respective side surfaces, near the guide pulleys 19, of the first interjoint members 7 of the finger mechanisms 2d, 2e that are next to each other, and extends from the finger mechanisms 2d, 2e toward the palm assembly 3. Stated otherwise, the wire 29 comprises a segment extending from the side surface of the first interjoint member 7 of the finger mechanism 2d and a segment extending from the side surface of the first interjoint member 7 of the finger mechanism 2e, the segments being integrally joined to each other.

The ends of the wire 29 extend around upper outer circumferential portions of the guide pulleys (near the front surfaces of the finger mechanisms 2d, 2e) of the finger mechanisms 2d, 2e and are fixed to the side surfaces of the first interjoint members 7 of the finger mechanisms 2d, 2e. The wire 29 is fixed to the first interjoint members 7 at positions lower than the upper ends of the guide pulleys 19 in the vertical direction. Therefore, when the wire 29 is pulled in its entirety toward the wrist base 4, the first interjoint members 7 are turned about the axes of the joint shafts 10a of the first joints 10 so that the front surfaces of the first interjoint members 7 of the finger mechanisms 2d, 2e move toward the palm assembly 3, thus bending the finger mechanisms 2d, 2e as described above.

The wire 30 has ends fixed to respective side surfaces, near the guide pulleys 19, of the first interjoint members 7 of the finger mechanisms 2b, 2c that are next to each other, and extends around upper outer circumferential portions of the guide pulleys 19 of the finger mechanisms 2b, 2c toward the palm assembly 3. Therefore, when the wire 30 is pulled in its entirety toward the wrist base 4, the first interjoint members 7 are turned about the axes of the joint shafts 10a of the first joints 10 so that the front surfaces of the first interjoint members 7 of the finger mechanisms 2b, 2c move toward the palm assembly 3, thus bending the finger mechanisms 2b, 2c in the same manner as the finger mechanisms 2d, 2e.

Guide rods 39 project from the respective fixed members 6 of the finger mechanisms 2d, 2e for guiding the portions of the wire 29 which extend from the finger mechanisms 2d, 2e toward the palm assembly 3, substantially in the direction in which the finger mechanisms 2d, 2e extend. Similarly, guide rods 39 also project from the respective fixed members 6 of the finger mechanisms 2b, 2c.

The wires 29, 30 are trained around the pulleys 32, 33 disposed in the palm assembly 3. The pulleys 32, 33 are held in the palm assembly 3 as follows:

A beam-like bracket 40 extending transversely across the palm assembly 3 is fixed to a portion of the hand back forming member 3a near the wrist base 4. An auxiliary member 41 extends from the bracket 40 toward a position between the finger mechanisms 2c, 2d. The auxiliary member 41 has a slot 41a defined therein longitudinally along a central line thereof, and a vertical shaft 42 having a vertical axis engages in the slot 41a. The vertical shaft 42 is movable longitudinally along the slot 41a. A pulley holder 43 in the form of a rectangular plate which extends transversely across the palm assembly 3 is mounted on the support shaft 42. The pulley holder 43 is angularly movable about the support shaft 42, and movable with the support shaft 42 longitudinally along the slot 41a. The pulleys 32, 33 around which the respective pulleys 29, 30 are trained are rotatably supported respectively both ends of the pulley holder 43 and spaced apart from each other transversely across the palm assembly 3.

With the above arrangement, the pulleys 32, 33 are longitudinally movable with the pulley holder 43, and are angularly movable about the support shaft 42 which is positioned between the pulleys 32, 33.

As shown in FIG. 2, the wire 31 has an end fixed to the tip of the second interjoint member 22 of the finger mechanism 2a within the finger mechanism 2. The wire 31 extends, from the tip, around an outer circumferential portion, near the front surface of the finger mechanism 2a, of the joint shaft 24a of the second joint 24 (a left outer circumferential portion of the joint shaft 24a in FIG. 2), and also around an outer circumferential portion of a guide pulley 44 rotatably mounted on the joint shaft 23a of the first joint 23 in the finger mechanism 2a, and then is drawn from the fixed member 20 into the palm assembly 3. Two guide pulleys 45, 46 are rotatably supported in the first interjoint member 21 for guiding the wire 31 from the tip of the second interjoint member 22 to the guide pulley 44 in predetermined different directions. The portion of the wire 31 which extends between the joint shaft 24a and the pulley 44 is trained around the guide pulleys 45, 46. The guide pulley 45 is positioned such that when the portion of the wire 31 which is drawn from the fixed member 20 is pulled, the force tending to bend the finger mechanism 2a is applied to the first interjoint member 21 about the axis of the joint shaft 23a of the first joint 23. Similarly, the guide pulley 46 is positioned such that when the portion of the wire 31 which is drawn from the fixed member 20 is pulled, the force tending to bend the finger mechanism 2a is applied to the second interjoint member 22 about the axis of the joint shaft 24a of the second joint 24.

The wire 31 which is drawn from the fixed member 20 of the finger mechanism 2a extends successively around outer circumferential portions of the pulleys 34, 35 which are rotatably supported on the bracket 40 at predetermined attitudes behind the pulley 33 and near the fixed member 20, and then is trained around a front outer circumferential portion of the pulley 36 which is rotatably supported on the pulley holder 43 concentrically with the support shaft 42. The pulley 36 corresponds to an auxiliary pulley member according to the present invention.

The wire 31 is drawn rearwardly from the pulley 36, and then extends around outer circumferential portions of the pulleys 37, 38 which are rotatably supported on the bracket 40 at predetermined attitudes behind the pulley 33. The wire 31 is then introduced through the wrist base 4 into the arm 5, as shown in FIG. 1.

The pulleys 34, 35, 37, 38 serve to control the direction and position of the wire 31. The pulleys 34, 35, 37, 38 may be replaced with rod-like members fixed to the bracket 40, and the wire 31 may be trained around those rod-like members, insofar as the rod-like members have a relatively low coefficient of friction with respect to the wire 31. Such a modification is also applicable to the guide pulleys 44–46 of the finger mechanism 2a and the guide pulleys 19 of the finger mechanisms 2b–2e around which the wires 29, 30 and the wires 18 as the biasing means.

An essential structure of the arm 5 into which the wire 31 drawn from the palm assembly 3 is introduced will be described below with reference to FIGS. 4 and 5.

As shown in FIG. 4, the arm 5 comprises an arm housing 50 providing an outer surface and a frame 51 mounted in the distal end of the arm housing 50 and supporting an actuator, etc. A joint shaft 52 connected to the wrist base 4 of the palm assembly 3 is rotatably supported in the frame 51 by a pair of bearings 53, 54, the joint shaft 52 having an axis extending in the longitudinal direction of the arm 5. The frame 51 supports thereon a drive motor 55 for rotating the palm assembly 3 with respect to the arm 5 (hereinafter referred to as a palm assembly rotating motor 55) and a drive motor 56 for pulling the wire 31 (hereinafter referred to as a hand finger driving motor 56), behind the joint shaft 52.

The joint shaft 52 has a front end projecting from the arm housing 50. The wrist base 4 of the palm assembly 3 is concentrically joined to the projecting front end of the joint shaft 52 by a threaded fastener 57. The palm assembly 3 is thus rotatable in unison with the joint shaft 52 about its axis. The joint shaft 52 has a through hole 52a defined centrally axially therein. The wire 31 drawn from the palm assembly 3 extends through the through hole 52a and is drawn rearwardly of the joint shaft 52.

A takeup shaft 58 which extends perpendicularly to the axis of the joint shaft 52 is disposed behind the joint shaft 52, and has opposite ends rotatably supported by the frame 51. The wire 31 drawn from the through hole 52a in the joint shaft 52 is engaged by the takeup shaft 58. When the takeup shaft 58 is rotated about its own axis in a predetermined direction, the wire 31 is wound around the takeup shaft 58 and pulled.

The hand finger driving motor 56 is mounted on the frame 51 parallel to the takeup shaft 58, and has a rotatable drive shaft 56a with a drive gear 59 mounted thereon. The drive gear 59 is operatively coupled to a driven pully 60 mounted on the takeup shaft 58 by a belt 61. When the hand finger driving motor 56 is rotated in one direction or the other, the takeup shaft 58 is rotated to wind the wire 31 therearound or unwind the wire 31 therefrom.

The portion of the wire 31 which is positioned in the arm 5 corresponds to a drive wire according to the present invention.

A driven pulley 62 is fitted over the joint shaft 52 for rotation in unison therewith. The palm assembly rotating motor 55 is mounted on the frame 51 parallel to the joint shaft 52, and has a rotatable drive shaft 55a with a gear 63 mounted thereon, as shown in FIG. 5. The gear 63 is operatively coupled to the driven gear 62 on the joint shaft 52 by a belt 64. When the palm assembly rotating motor 55 is rotated in one direction or the other, the palm assembly 3 is rotated about the axis of the joint shaft 52 in unison with the wrist base 4 that is joined to the joint shaft 52.

In the present embodiment, the joint shaft 52 and the wire 31 are made of an insulating material such as a resin material or the like. The arm housing 50 including a portion 50a thereof (see FIG. 4) held against the wrist base 4 is made of a resin material. Therefore, the arm 5 and the palm assembly 3 are electrically insulated from each other.

Although not shown, the arm housing 50 houses therein an encoder for detecting an angular position of the palm assembly rotating motor 55 (which corresponds to an angular position of the palm assembly 3 with respect to the arm 5) and an encoder for detecting an angular position of the hand finger driving motor 56 (which corresponds to a length of the wire 31 that is wound around the takeup shaft 58). The palm assembly rotating motor 55 and the hand finger driving motor 56 are controlled in operation by a controller (not shown) based on detected data from the encoders.

Operation of the multi-fingered hand device 1 according to the present invention will be described below.

First, basic operation of the multi-fingered hand device 1 will be described below. Of the finger mechanisms 2a–2e, the finger mechanisms 2b–2e are usually extended as shown in FIGS. 1 and 2 under the bias of the corresponding springs 16. Similarly, the finger mechanism 2a is usually extended as shown in FIGS. 1 and 2 under the bias of the springs 25, 26.

When the hand finger driving motor 56 in the arm 5 is energized to rotate the takeup shaft 58 in the direction to wind the wire 31 that extends from the palm assembly 3 into the arm 5, the wire 31 is pulled in the direction indicated by the arrow y3 in FIGS. 1 and 2. At this time, the tip of the second interjoint member 22 of the finger mechanism 2a is pulled by the wire 31 to bend the finger mechanism 2a, and the pulley 36 is pulled rearwardly. Basically, the pulley holder 43 and the pulleys 32, 33 are moved, in unison with the pulley 36, rearwardly from the position shown in FIG. 2 as shown in FIG. 6. As a result, the first interjoint members 7, 7 of the finger mechanisms 2d, 2e are pulled by the wire 29 to bent the finger mechanisms 2d, 2e, and the first interjoint members 7, 7 of the finger mechanisms 2b, 2c are pulled by the wire 30 to bent the finger mechanisms 2b, 2c. Thus, as shown in FIG. 6, all the finger mechanisms 2a–2e are bent in order to grip an object (not shown) therebetween. Therefore, under the drive force of the single hand finger driving motor 56, the wire 31 is pulled from the palm assembly 3 toward the arm 5 and wound around the takeup shaft 58, thereby bending the finger mechanisms 2a–2e altogether. The finger mechanisms 2a–2e can now work on an object, e.g., grip an object.

With the multi-fingered hand device 1 according to the present embodiment, even if either one of the finger mechanisms 2a–2e abuts against an object to be gripped and fails to be bent further when the finger mechanisms 2a–2e are making a bending action as described above, the other finger mechanisms can make a bending action. Specifically, referring to FIG. 6, if the finger mechanism 2e abuts against an object to be gripped and fails to be bent further when the finger mechanisms 2a–2e are making a bending action, the pulley 32 around which the wire 29 connected to the finger mechanism 2e is trained can move rearwardly (toward the wrist base 4) while rotating insofar as the finger mechanism 2d next to the finger mechanism 2e can be bent further. The pulley 33 around which the wire 30 extending from the finger mechanisms 2b, 2c is trained can move rearwardly insofar as either one of the finger mechanisms 2b, 2c can be bent further. Insofar as the finger mechanism 2a can be bent further, when the wire 31 is wound around the takeup shaft 58 in the arm 5, the length of the portion of the wire 31 which extends from the pulley 34 to the tip of the finger mechanism 2a becomes smaller, causing the finger mechanism 2a to make a bending action.

Therefore, while the finger mechanisms 2a–2e are making a bending action, even if the finger mechanism 2e fails to be bent further, since the pulleys 32, 33 can be moved together with the pulley holder 43 and the pulley 36 toward the arm 5 while winding the wire 31 around the takeup shaft 58, the other finger mechanisms 2a–2e can be bent further.

The above operation holds true even if either one of the finger mechanisms 2b–2d fails to be bent.

If the finger mechanism 2a fails to be bent further, then the length of the portion of the wire 31 which extends from the pulley 34 to the tip of the finger mechanism 2a remains unchanged. However, when the wire 31 is wound around the takeup shaft 58 in the arm 5, the pulley 36 moves rearwardly together with the pulleys 32, 33. Therefore, the finger mechanisms 2b–2e can make a bending action.

As described above, even if either one of the finger mechanisms 2a–2e fails to be bent further, the other finger mechanisms can make a bending action by winding the wire 31 around the takeup shaft 58 (moving the wire 31 into the arm 5).

Moreover, even if either two of the finger mechanisms 2a–2e abut against an object to be gripped and fail to be bent further when the finger mechanisms 2a–2e are making a bending action, the other finger mechanisms can make a bending action.

For example, if the finger mechanisms 2c, 2d of the finger mechanisms 2b–2e fail to be bent, the pulley 33 around which the wire 30 connected to the finger mechanism 2b is trained can move rearwardly while rotating in the same manner as if only the finger mechanism 2c fails to be bent. Similarly, the pulley 32 around which the wire 29 connected to the finger mechanism 2e is trained can move rearwardly while rotating. When the wire 31 is wound around the takeup shaft 58, the length of the portion of the wire 31 which extends from the pulley 34 to the tip of the finger mechanism 2a becomes smaller, causing the finger mechanism 2a to make a bending action.

Therefore, even if the finger mechanism 2c and the finger mechanism 2d fail to be bent further, the other finger mechanisms 2a, 2b, 2e can make a bending action by winding the wire 31 around the takeup shaft 58 in the arm 5. The above operation holds true even if the pair of the finger mechanisms 2b, 2d, the pair of the finger mechanisms 2b, 2e, or the pair of the finger mechanisms 2c, 2e fails to be bent.

Even if the finger mechanism 2*a* and either one of the finger mechanisms 2*b*–2*e* fail to be bent, since the pulleys 32, 33 can move rearwardly together with the pulley 36, the other finger mechanisms can make a bending action by winding the wire 31 around the takeup shaft 58.

Moreover, even if the pair of the finger mechanisms 2*b*, 2*c* or the pair of the finger mechanisms 2*d*, 2*e* fails to be bent, the other finger mechanism can make a bending action.

For example, if the pair of the finger mechanisms 2*b*, 2*c* fails to be bent, then the pulley 33 around which the wire 30 extending from the finger mechanisms 2*b*, 2*c* is trained cannot move rearwardly. However, the pulley 32 around which the wire 29 extending from the finger mechanisms 2*d*, 2*e* is trained and the pulley 36 positioned intermediately on the pulley holder 43 can move rearwardly (toward the arm 5) when the pulley holder 43 is angularly moved about the support shaft 42 from the imaginary-line position as indicated by the solid lines in FIG. 7. Therefore, even if the pair of the finger mechanisms 2*b*, 2*c* fails to be bent, the other finger mechanisms 2*a*, 2*d*, 2*e* can make a bending action while winding the wire 31 around the takeup shaft 58 in the arm 5. This operation holds true if the pair of the finger mechanisms 2*d*, 2*e* fails to be bent. In this case, however, the pulley holder 43 is angularly moved about the support shaft 42 in the direction (clockwise) opposite to the direction shown in FIG. 7.

Therefore, even if either two of the finger mechanisms 2*a*–2*e* fail to be bent, the other finger mechanisms can make a bending action by winding the wire 31 around the takeup shaft 58.

Likewise, even if either three of the finger mechanisms 2*a*–2*e* fail to be bent further, the remaining two finger mechanisms can make a bending action. In this case, basically, the pulley holder 43 is angularly moved to allow the remaining two finger mechanisms to make a bending action as shown in FIG. 7.

Moreover, even if either four of the finger mechanisms 2*a*–2*e* fail to be bent further, the remaining one finger mechanism can make a bending action. In this case, if the finger mechanism 2*a* and either three of the finger mechanisms 2*b*–2*e* fail to be bent further, then basically, the pulley holder 43 is angularly moved to allow the remaining one finger mechanism to make a bending action as shown in FIG. 7. If the four finger mechanisms 2*b*–2*e* other than the finger mechanism 2*a* fail to be bent further, then the pulley holder 43 and the pulleys 32, 33, 36 supported thereon cannot move rearwardly, but the length of the portion of the wire 31 which extends from the pulley 34 to the tip of the finger mechanism 2*a* becomes smaller as the wire 31 is wound around the takeup shaft 58, causing the finger mechanism 2*a* to make a bending action.

With the multi-fingered hand device 1 according to the present embodiment, as described above, under the drive force of the single hand finger driving motor 56, the wire 31 is wound around the takeup shaft 58, thereby bending all the finger mechanisms 2*a*–2*e* altogether. Therefore, the finger mechanisms 2*a*–2*e* are not required to have respective actuators for operating them, but the five finger mechanisms 2*a*–2*e* can work on an object (not shown), e.g., grip an object, with fewer actuators. Even if any of the finger mechanisms 2*a*–2*e* abut against the object and fail to be bent further, since the other finger mechanisms can be bent, the finger mechanisms 2*a*–2*e* can grip the object reliably.

In the above description, the bending action of the finger mechanisms 2*a*–2*e* from their extended position has been described. However, the same advantages can be achieved in extending the finger mechanisms 2*a*–2*e* from their bent position. Specifically, when the tensile force applied from the single hand finger driving motor 56 to the wire 31 (the force to wind the wire 31 around the takeup shaft 58) is released while the finger mechanisms 2*a*–2*e* are being bent, the finger mechanisms 2*b*–2*e* are basically extended under the bias of the corresponding springs 16 and the finger mechanism 2*a* is basically extended under the bias of the springs 25, 26. Even if any of the finger mechanisms 2*a*–2*e* abut against an obstacle and fail to be bent further, the other finger mechanisms 2*a*–2*e* can be extended without fail when the pulleys 32, 33, 36 move in the longitudinal direction and the pulley holder 43 holding these pulleys are angularly moved.

With the multi-fingered hand device 1 according to the present embodiment, the palm assembly rotating motor 55 in the arm 5 is energized to turn the palm assembly 3 together with the joint shaft 52 about the axis of the joint shaft 52. Since the wire 31 extending from the palm assembly 3 into the arm 5 lies along the axis of the joint shaft 52 about which the palm assembly 3 is turned, the palm assembly 3 is turned without the wire 31 being pulled. Consequently, the palm assembly 3 is turned with respect to the arm 5 without affecting the bent or extended state of the finger mechanisms 2*a*–2*e*.

With the multi-fingered hand device 1 according to the present embodiment, furthermore, the parts of the finger mechanisms 2*b*–2*e* except the finger mechanism 2*a*, which range from the second joint 11 to the tip (the parts including the second interjoint member 8, the third interjoint member 9, the third joint 12, and the link arm 15) are identical in shape and size, they can share backup parts. The number of types of the parts required in the multi-fingered hand device 1 is reduced, and hence the parts can be managed with ease.

With respect to the finger mechanisms 2*b*–2*e* of the multi-fingered hand device 1 according to the present embodiment, when the first interjoint member 7 closest to the palm assembly 3 is turned with respect to the fixed member 6 about the axis of the joint shaft 10*a* of the first joint 10 by the link mechanism 13, the second interjoint member 8 and the third interjoint member 9 are turned respectively with respect to the first interjoint member 7 and the second interjoint member 8 in ganged relation to the first interjoint member 7, thereby bending and extending the finger mechanisms 2*b*–2*e*. Therefore, the length of the wire 29 from the pulley 32 to the points where the wire 29 is fixed to the finger mechanisms 2*d*, 2*e* is small, and similarly the length of the wire 30 from the pulley 33 to the points where the wire 30 is fixed to the finger mechanisms 2*b*, 2*c* is small. Consequently, the overall required lengths of these wires 29, 30 are small, resulting in an advantage as to the cost.

With the multi-fingered hand device 1 according to the present embodiment, furthermore, since the palm assembly 3 is electrically insulated from the arm 5, as described above, even when the palm assembly 3 is put into water, currents flowing in electric components such the motors 55, 56 in the arm 5 are prevented from leaking into the palm assembly 3. As a result, the multi-fingered hand device 1 is allowed to work on an object, e.g., grip an object, in water.

The present invention is not limited to the above embodiment, but may be modified as follows:

In the above embodiment, the finger mechanisms 2*a*–2*e* are biased to the extended position. However, the finger mechanisms 2*a*–2*e* may be biased to the bent position. Such an embodiment may be achieved by modifying the multi-fingered hand device 1 according to the above embodiment as follows: The finger mechanisms 2b–2e incorporating the link mechanisms 13 are based on the extended position by a power spring or the like mounted on the first interjoint member 7, rather than the springs 16 connected to the first interjoint member 7. The wires 29, 30 extending from the first interjoint member 7 of the finger mechanisms 2b–2e extend around lower outer circumferential portions of the guide pulleys 19 of the corresponding finger mechanisms 2b–2e (near the back surfaces of the finger mechanisms 2b–2e) toward the palm assembly 3. The finger mechanism 2a is biased to the extended position by a power spring or the like mounted on the first and second joints 23, 34 rather than the springs 25, 26 used to bias the finger mechanism 2a to the extended position. The path of the wire 31 in the finger mechanism 2a is adjusted (e.g., the wire 31 is laid out along the back surface of the finger mechanism 2a) such that when the wire 31 extending from the tip of the finger mechanism 2a, the finger mechanism 2a is extended.

The structural details other than the above structure may be identical to those of the multi-fingered hand device 1 according to the above embodiment. With the multi-fingered hand device 1 thus constructed, the finger mechanisms 2a–2e are extended altogether by pulling the wire 31 into the arm 5. Even if any of the finger mechanisms 2a–2e are prevented from being extended by abutting against an object at this time, the remaining finger mechanisms can be extended by the same operation as described above.

In the above embodiment, the finger mechanisms 2a–2e are bent by introducing the wire 31 coupled to the finger mechanism 2a into the arm 3 and pulling the wire 31 with the hand finger driving motor 56. However, the end of the wire 31 which is drawn from the pulley 38 may be fixed to the palm assembly 3, and an intermediate portion of the wire 31 may be pulled to bend the finger mechanisms 2a–2e. In such a modification, the pulley 37 in the above embodiment is rotatably held by a pulley holder which is movable in the longitudinal direction, and a wire member is drawn from the wire holder into the arm 5. When the wire member is pulled by an actuator in the arm 5, the finger mechanisms 2a–2e can make a bending action.

In the above embodiment, the finger mechanisms 2b–2e have the link mechanism 13. When the wires 29, 30 extending from the first interjoint member 7 of the finger mechanisms 2b–2e are pulled to turn the first interjoint member 7 about the axis of the joint shaft 10a of the first joint 10, the second interjoint members 8, 9 are turned in ganged relation to the first interjoint member 7 to bend and extend the finger mechanisms 2b–2e. However, a wire member extending from the second interjoint member 8 of the finger mechanisms 2b–2e may be pulled to turn the second interjoint member 8 to bend and extend the finger mechanisms 2b–2e. In such a modification, the opposite ends of the wire 29 trained around the pulley 32 according to the above embodiment are fixed to the second interjoint member 8 of the finger mechanisms 2d, 2e at positions near the front surfaces thereof, and the opposite ends of the wire 30 trained around the pulley 33 are fixed to the second interjoint member 8 of the finger mechanisms 2b, 2c at positions near the front surfaces thereof. When the pulleys 32, 33 are moved rearwardly (toward the arm 5) to pull the wires 28, 30, the second interjoint member 8 and the first interjoint member 7 of the finger mechanisms 2b–2e are turned respectively about the axes of the second joint 11 and the first joint 12. The first interjoint member 7 and the third joint member 9 of the finger mechanisms 2b–2e may be coupled to each other by the link arm 15 in the above embodiment to cause the third interjoint member 9 to turn about the axis of the joint shaft 12a of the third joint 12 in ganged relation to the second interjoint member 8 as it is turned.

In the above embodiment, the multi-fingered hand device 1 with the five finger mechanisms 2a–2e has been described. However, the present invention is also applicable to a multi-fingered hand device having three or four finger mechanisms.

Industrial Applicability:

As described above, the present invention is useful as a hand device of a robot, such as a human-shaped robot, for performing various operations with a plurality of finger mechanisms extending from a palm assembly.

What is claimed is:

1. A multi-fingered hand device having a palm assembly mounted on a distal end of an arm, a plurality of finger mechanisms extending from the palm assembly and each comprising a plurality of interjoint members successively connected by a plurality of finger joints, biasing means for biasing the finger mechanisms to either one of an extended position and a bent position, wire members extending from the finger mechanisms toward the palm assembly, and drive means for pulling the wire members extending from the finger mechanisms against a bias of said biasing means for bending or extending the finger mechanisms, wherein:

two wire members extending respectively from at least two of said plurality of finger mechanisms have ends near the palm assembly that are integrally coupled to each other; and at least one of said plurality of finger mechanisms has a link mechanism coupled to the interjoint members thereof and operable in ganged relation to angular movement of one of the interjoint members connected to a first finger joint, which is the closest of said plurality of finger joints of said one finger mechanism to said palm assembly, for turning the interjoint members about the other joints, said wire member which extends from said one finger mechanism extends from a first interjoint member, which is the closest of said plurality of interjoint members of said one finger mechanism to the palm assembly; and said drive means comprises a pulley member around which said two wire members, which are integrally coupled to each other, are trained, and a pulley holder on which said pulley member is rotatably held, said pulley holder being mounted on said palm assembly for movement in unison with said pulley member in a direction to pull said two wire members, and said pulley holder is moved to pull the wire member extending from the two finger mechanisms for bending or extending said two finger mechanisms;

said finger mechanisms comprise at least three finger mechanisms; and said drive means comprises an auxiliary pulley member rotatably held by said pulley holder, with a wire member extending from another finger mechanism than said two finger mechanisms and trained around said auxiliary pulley member, and the wire member extending from the other finger mechanism is pulled in a direction that the auxiliary pulley member moves together with the pulley holder to pull the wire member extending from said two finger mechanisms for bending or extending said two finger mechanisms and said other finger mechanism.

2. A multi-fingered hand device according to claim 1, wherein at least two of the interjoint members of each of at least two of said plurality of finger mechanisms are identical in structure to each other.

3. A multi-fingered hand device according to claim 1, wherein said palm assembly is disposed for rotation about an axis extending substantially in a longitudinal direction of said arm, and said drive means comprises means having at least one drive wire member extending from said palm assembly into said arm, and an actuator for applying a drive force to said drive wire member tending to pull the drive wire member into the arm, said means being arranged for transmitting a force tending to pull the wire members extending from the finger mechanisms from said actuator through said drive wire member to the palm assembly, said drive wire member being disposed in said arm along an axis about which said palm assembly is rotatable.

4. A multi-fingered hand device according to claim 3, wherein said arm and said palm assembly are electrically insulated from each other, said drive wire member being made of an insulating material.

5. A multi-fingered hand device according to claim 1, wherein the finger mechanisms comprise n (n=1, 2, . . . ) interjoint members successively connected by n joints, the first interjoint member is turned about an axis of a joint shaft so that the front surface of the first interjoint member moves toward the palm assembly by pulling the wire member extending from the finger mechanism, and the link mechanism comprises a link arm having an end rotatably supported on the palm assembly (or the fixed member) by a support shaft at a position that is closer to a back surface of the finger mechanism than the joint shaft of the first joint, and another end rotatably supported on the interjoint member adjacent to the first interjoint member by a support shaft at a position which is closer to a front surface of the finger mechanism than a joint shaft of a joint adjacent to the first joint.

6. A multi-fingered hand device according to claim 5, wherein the link mechanism further comprises the link arm having an end rotatably supported on the i-th interjoint member (i=2, 3, . . . n-1) by a support shaft at a position that is closer to the back surface of the finger mechanism than the joint shaft of the i-th joint, and another end rotatably supported on the i+1th interjoint member by a support shaft at a position which is closer to the front surface of the finger mechanism than the joint shaft of the i+1th joint.

7. A multi-fingered hand device according to claim 6, wherein n=3.

8. A multi-fingered hand device according to claim 5, wherein the driving means further comprises a guide pulley that is rotatable about the joint shaft of the first joint and being disposed on the respective finger mechanism at a position near the side surface of the first interjoint member, and the wire member extending from the finger mechanism around lower outer circumferential portion of a guide pulley at the front surface of the finger mechanism is fixed to a side surface of the first interjoint member at a position closer to the back surface of the finger mechanism than the end of the guide pulley that is closest to the front end of the finger mechanism.

9. A multi-fingered hand device having a palm assembly mounted on a distal end of an arm, a plurality of at least four finger mechanisms extending from the palm assembly and each comprising a plurality of interjoint members successively connected by a plurality of finger joints, biasing means for biasing the finger mechanisms to either one of an extended position and a bent position, wire members extending from the finger mechanisms toward the palm assembly, and drive means for pulling the wire members extending from the finger mechanisms against a bias of said biasing means for bending or extending the finger mechanisms, wherein:

at least four of said plurality of finger mechanisms are classified into two pairs of two finger mechanisms, with two wire members extending from each of the two finger mechanisms in each pair and having ends near the palm assembly that are integrally coupled to each other;

said drive means comprises a pair of pulley members around which said two wire members, which are integrally coupled to each other in each of two finger mechanisms in each pair, are trained, respectively, and a pulley holder on which said pulley members are rotatably held at a spaced interval, said pulley holder being mounted on said palm assembly for angular movement about a support intermediate between the pulley members in unison with said pair of pulley members in a direction to pull said wire members extending respectively from said four finger mechanisms, and said pulley holder is moved to pull the wire members extending from the four finger mechanisms for bending or extending said four finger mechanisms; and said finger mechanisms comprise at least five finger mechanisms, said drive means comprising an auxiliary pulley member rotatably held by said pulley holder between said pair of pulley members, with a wire member extending from another finger mechanism than said four finger mechanisms and trained around said auxiliary pulley member, and the wire member extending from the other finger mechanism is pulled in a direction that the auxiliary pulley member moves together with the pulley holder to pull the wire members extending from said four finger mechanisms for bending or extending said four finger mechanisms and said other finger mechanism.

10. A multi-fingered hand device according to claim 9, wherein at least one of said plurality of finger mechanisms has a link mechanism coupled to the interjoint members thereof and operable in ganged relation to angular movement of a first interjoint member, which is the closest of said plurality of interjoint members of said one finger mechanism to the palm assembly, connected to a first finger joint, which is the closest finger joint of said one finger mechanism to the palm assembly, for turning the interjoint members about the other joints, said wire member which extends from said one finger mechanism extends from the first interjoint member.

11. A multi-fingered hand device according to claim 10, wherein the finger mechanism comprises n (n=1, 2, . . . ) interjoint members successively connected by n joints, the first interjoint member is turned about an axis of a joint shaft so that the front surface of the first interjoint member of the finger mechanism moves toward the palm assembly by pulling the wire member extending from the finger mechanism, and the link mechanism comprises a link arm having an end rotatably supported on the palm assembly (or the fixed member) by a support shaft at a position that is closer to a back surface of the finger mechanism than the joint shaft of the first joint, and another end rotatably supported on the interjoint member adjacent to the first interjoint member by a support shaft at a position which is closer to a front surface of the finger mechanism than a joint shaft of a joint adjacent to the first joint.

12. A multi-fingered hand device according to claim 11, wherein the link mechanism further comprises the link arm having an end rotatably supported on the i-th interjoint member (i=2, 3, . . . n-1) by a support shaft at a position which is closer to the back surface of the finger mechanism than the joint shaft of the i-th joint, and another end rotatably supported on the i+1th interjoint member by a support shaft at a position that is closer to the front surface of the finger mechanism than the joint shaft of the l+1th joint.

13. A multi-fingered hand device according to claim 12, wherein n=3.

14. A multi-fingered hand device according to claim 11, wherein the driving means further comprises a guide pulley that is rotatable about the first joint shaft and being disposed on the respective finger mechanism at a position near the side surface of the first interjoint member, and the wire member extending from the finger mechanism around a lower outer circumferential portion of a guide pulley at the front surface of the finger mechanism is fixed to side surface of the first interjoint member at a position closer to the back surface of the finger mechanism than the end of the guide pulley that is closest to the front end of the finger mechanism.

15. A multi-fingered hand device according to claim 9, wherein at least one of said plurality of finger mechanisms has a link mechanism coupled to the interjoint members thereof and operable in ganged relation to angular movement of a first interjoint member, which is the closest of said plurality of interjoint members of said one finger mechanism to the palm assembly, connected to a first finger joint, which is the closest of said plurality of finger joints of said one finger mechanism to the palm assembly, for turning the interjoint members about the other joints, said wire member which extends from said one finger mechanism extends from the first interjoint member.

16. A multi-fingered hand device according to claim 9, wherein at least two of the interjoint members of each of at least two of said plurality of finger mechanisms are identical in structure to each other.

* * * * *